United States Patent
Lee et al.

(10) Patent No.: US 12,445,263 B2
(45) Date of Patent: Oct. 14, 2025

(54) METHOD AND DEVICE FOR PERFORMING HOMOMORPHIC PERMUTATION

(71) Applicants: SEOUL NATIONAL UNIVERSITY R&DB FOUNDATION, Seoul (KR); INDUSTRY-ACADEMIC COOPERATION FOUNDATION, CHOSUN UNIVERSITY, Gwangju (KR)

(72) Inventors: Joon-Woo Lee, Seoul (KR); Jong-Seon No, Seoul (KR); Yong-Woo Lee, Seoul (KR); Seung-Jae Chae, Seoul (KR); Young-Sik Kim, Seoul (KR)

(73) Assignees: SEOUL NATIONAL UNIVERSITY R&DB FOUNDATION, Seoul (KR); INDUSTRY-ACADEMIC COOPERATION FOUNDATION, CHOSUN UNIVERSITY, Gwangju (KR)

( * ) Notice: Subject to any disclaimer, the term of this patent is extended or adjusted under 35 U.S.C. 154(b) by 219 days.

(21) Appl. No.: 17/968,368

(22) Filed: Oct. 18, 2022

(65) Prior Publication Data
US 2023/0379134 A1    Nov. 23, 2023

(30) Foreign Application Priority Data
May 19, 2022   (KR) .......................... 10-2022-0061561

(51) Int. Cl.
*H04L 9/00* (2022.01)
*H04L 9/06* (2006.01)

(52) U.S. Cl.
CPC ............ *H04L 9/008* (2013.01); *H04L 9/0631* (2013.01)

(58) Field of Classification Search
None
See application file for complete search history.

(56) References Cited

U.S. PATENT DOCUMENTS 10,476,661 B2 * 11/2019  Mandal ................. H04L 9/0894
10,491,578 B1    11/2019  Herbert et al.
(Continued)

FOREIGN PATENT DOCUMENTS

KR        10-1475747 B1    12/2014
KR   10-2016-0105717 A     9/2016
(Continued)

OTHER PUBLICATIONS

Liu; Practical Fully Homomorphic Encryption without Noise Reduction; from scholar.google.com (Year: 2015).*
(Continued)

*Primary Examiner* — Kambiz Zand
*Assistant Examiner* — Mahabub S Ahmed
(74) *Attorney, Agent, or Firm* — Sughrue Mion, PLLC

(57) ABSTRACT

A method of performing a homomorphic permutation by a server includes: generating, via a ciphertext generation portion, a first ciphertext by adding noise to the basic ciphertext; transmitting, via a transmission portion, the first ciphertext to a client; performing, via an operation portion, a predetermined operation on the noise; receiving, via a reception portion, a second ciphertext from the client; and extracting, via an extraction portion, the basic ciphertext on which the predetermined operation is performed, by removing, from the second ciphertext, the noise on which the predetermined operation is performed, wherein the second ciphertext is a ciphertext that is re-encrypted by the client after decrypting the first ciphertext and performing the predetermined operation on the decrypted first ciphertext.

15 Claims, 5 Drawing Sheets

(56) References Cited

U.S. PATENT DOCUMENTS

| | | | |
|---|---|---|---|
| 10,608,811 B2 | 3/2020 | Chen et al. | |
| 11,431,470 B2* | 8/2022 | Jiang | H04L 9/0631 |
| 2003/0223579 A1* | 12/2003 | Kanter | H04L 9/3247 |
| | | | 380/28 |
| 2011/0110525 A1* | 5/2011 | Gentry | H04L 9/14 |
| | | | 380/285 |
| 2013/0329883 A1* | 12/2013 | Tamayo-Rios | H04L 9/008 |
| | | | 380/28 |
| 2014/0146969 A1* | 5/2014 | Sadot | H04K 1/006 |
| | | | 380/256 |
| 2014/0325230 A1* | 10/2014 | Sy | H04L 9/3231 |
| | | | 713/171 |
| 2015/0124962 A1 | 5/2015 | Gentry et al. | |
| 2015/0365229 A1* | 12/2015 | Patey | H04L 9/0869 |
| | | | 380/30 |
| 2016/0105402 A1* | 4/2016 | Soon-Shiong | H04L 9/008 |
| | | | 713/164 |
| 2016/0191233 A1 | 6/2016 | Loftus et al. | |
| 2017/0004324 A1* | 1/2017 | Seo | H04L 9/008 |
| 2017/0180115 A1* | 6/2017 | Laine | H04L 9/0618 |
| 2017/0359321 A1 | 12/2017 | Rindal et al. | |
| 2019/0007197 A1* | 1/2019 | Laine | H04L 9/3093 |
| 2019/0007390 A1* | 1/2019 | Wu | H04L 9/0861 |
| 2019/0141051 A1* | 5/2019 | Ikarashi | H04L 63/00 |
| 2019/0363871 A1* | 11/2019 | Cheon | H04L 9/304 |
| 2020/0059351 A1* | 2/2020 | Atallah | H04L 9/008 |
| 2020/0151356 A1 | 5/2020 | Rohloff et al. | |
| 2020/0252199 A1* | 8/2020 | Cheon | H04L 9/3093 |
| 2020/0295917 A1* | 9/2020 | Li | H04L 9/008 |
| 2020/0327250 A1 | 10/2020 | Wang et al. | |
| 2021/0119765 A1* | 4/2021 | Jankly | H04L 9/0891 |
| 2021/0256162 A1* | 8/2021 | Liphardt | G06F 21/6245 |
| 2021/0328762 A1* | 10/2021 | Becher | H04L 63/0428 |
| 2021/0344489 A1* | 11/2021 | Becher | H04L 9/085 |
| 2022/0116198 A1* | 4/2022 | Na | H04L 9/3093 |
| 2022/0116199 A1 | 4/2022 | Kim et al. | |
| 2024/0214178 A1* | 6/2024 | Tamiya | H04L 9/008 |
| 2025/0047462 A1* | 2/2025 | Lu | H04L 9/008 |

FOREIGN PATENT DOCUMENTS

| | | |
|---|---|---|
| KR | 10-2257779 B1 | 5/2021 |
| KR | 10-2021-0067961 A | 6/2021 |
| KR | 10-2021-0158824 A | 12/2021 |

OTHER PUBLICATIONS

M'eaux1 et al.; Towards Stream Ciphers for Efficient FHE with Low-Noise Ciphertexts; from scholar.google.com (Year: 2016).*

Wu et al.; Using Homomorphic Encryption for Large Scale Statistical Analysis; from scholar.google.com (Year: 2018).*

Yonetani et al.; Privacy-Preserving Visual Learning Using Doubly Permuted Homomorphic Encryption; from scholar.google.com (Year: 2017).*

International Search Report dated Feb. 16, 2023 in International Application No. PCT/KR2022/016242.

Wu et al., "Secure and Efficient Outsourced k-Means Clustering using Fully Homomorphic Encryption With Ciphertext Packing Technique" IEEE Transactions on Knowledge and Data Engineering, Oct. 2021, vol. 33, No. 10, pp. 3424-3437 (15 pages total).

Emmanuela Orsini et al., "Overdrive2K: Efficient Secure MPC over Z2k from somewhat Homomorphic Encryption", imec-COSIC, KU Leuven, pp. 1-39.

Office Action issued Nov. 13, 2024 in Korean Patent Application No. 10-2022-0061561.

* cited by examiner

METHOD AND DEVICE FOR PERFORMING HOMOMORPHIC PERMUTATION

CROSS-REFERENCE TO RELATED APPLICATION

This application is based on and claims priority under 35 U.S.C. § 119 to Korean Patent Application No. 10-2022-0061561, filed on May 19, 2022, in the Korean Intellectual Property Office, the disclosure of which is incorporated by reference herein in its entirety.

BACKGROUND

1. Field

One or more embodiments relate to mixing of homomorphic encryption and multilateral calculations. More particularly, one or more embodiments relate to a method of performing a homomorphic permutation from among multilateral calculations.

2. Description of the Related Art

Homomorphic rotation refers to an operation performed in an encrypted state to enable a cyclic shift on a vector in which a number of pieces of data are respectively moved with a fixed shift step in cyclic manner. However, it may take a long time to perform a homomorphic rotation in an encrypted state.

Also, a different arithmetic key is required for each rotation step of the homomorphic rotation operation. An arithmetic key occupies a memory of dozens to hundreds of megabytes. Thus, as the number of types of rotation steps increases, the number of arithmetic keys may increase too much, which makes it difficult to manage the memory.

Also, since there is no other permutation than homomorphic rotation, a required permutation has to be realized by synthesis of a number of homomorphic rotation operations. In this case, time required for processing a complex operation may significantly increase.

SUMMARY

According to an embodiment of the disclosure, an operation time required when a cyclic shift is generated, by using communication, in an encrypted state for a homomorphic permutation may be reduced, and the homomorphic permutation may be performed without an arithmetic key. Also, a general permutation may be efficiently performed in an encrypted state without going through homomorphic rotation.

Additional aspects will be set forth in part in the description which follows and, in part, will be apparent from the description, or may be learned by practice of the presented embodiments of the disclosure.

According to one or more embodiments, a method of performing a homomorphic permutation by a server includes: generating, via a ciphertext generation portion, a first ciphertext by adding noise to the basic ciphertext; transmitting, via a transmission portion, the first ciphertext to a client; performing, via an operation portion, a predetermined operation on the noise; receiving, via a reception portion, a second ciphertext from the client; and extracting, via an extraction portion, the basic ciphertext on which the predetermined operation is performed, by removing, from the second ciphertext, the noise, on which the predetermined operation is performed, wherein the second ciphertext is a ciphertext that is re-encrypted by the client after decrypting the first ciphertext and performing the predetermined operation on the decrypted first ciphertext. The terminal may include a server.

The predetermined operation may be a permutation operation.

The predetermined operation may be a cyclic shift operation.

The basic ciphertext may be a ciphertext with respect to original data encrypted by using a homomorphic algorithm.

The noise may be in a form of a polynomial expression extracted from a predetermined uniform distribution.

A server and the client may perform wired or wireless communication with each other.

A server and the client may have a prior agreement with respect to the predetermined operation.

According to one or more embodiments, a method of performing a homomorphic permutation by a client includes: receiving, via a reception portion, a first ciphertext from a server; decrypting, via a decryption portion, the first ciphertext by using a secret key; performing, via an operation portion, a predetermined operation on the decrypted first ciphertext; generating, via a re-encryption portion, a second ciphertext by re-encrypting the first ciphertext on which the predetermined operation is performed; and transmitting, via a transmission portion, the second ciphertext to the server, wherein the first ciphertext is a ciphertext that is modified from a basic ciphertext by the server adding noise to the basic ciphertext.

The predetermined operation may be a permutation operation.

The predetermined operation may be a cyclic shift operation.

According to one or more embodiments, a device for performing a homomorphic permutation includes at least one processor to implement: an ciphertext generation portion configured to generate a first ciphertext by adding noise to the basic ciphertext; a transmission portion configured to transmit the first ciphertext to a terminal; a reception portion configured to receive a second ciphertext from the terminal; an operation portion configured to perform a predetermined operation on the noise; and an extraction portion configured to extract the basic ciphertext on which the predetermined operation is performed, by removing, from the second ciphertext, the noise, on which the predetermined operation is performed; wherein the second ciphertext is a ciphertext that is re-encrypted by the terminal after decrypting the first ciphertext and performing the predetermined operation on the decrypted first ciphertext.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
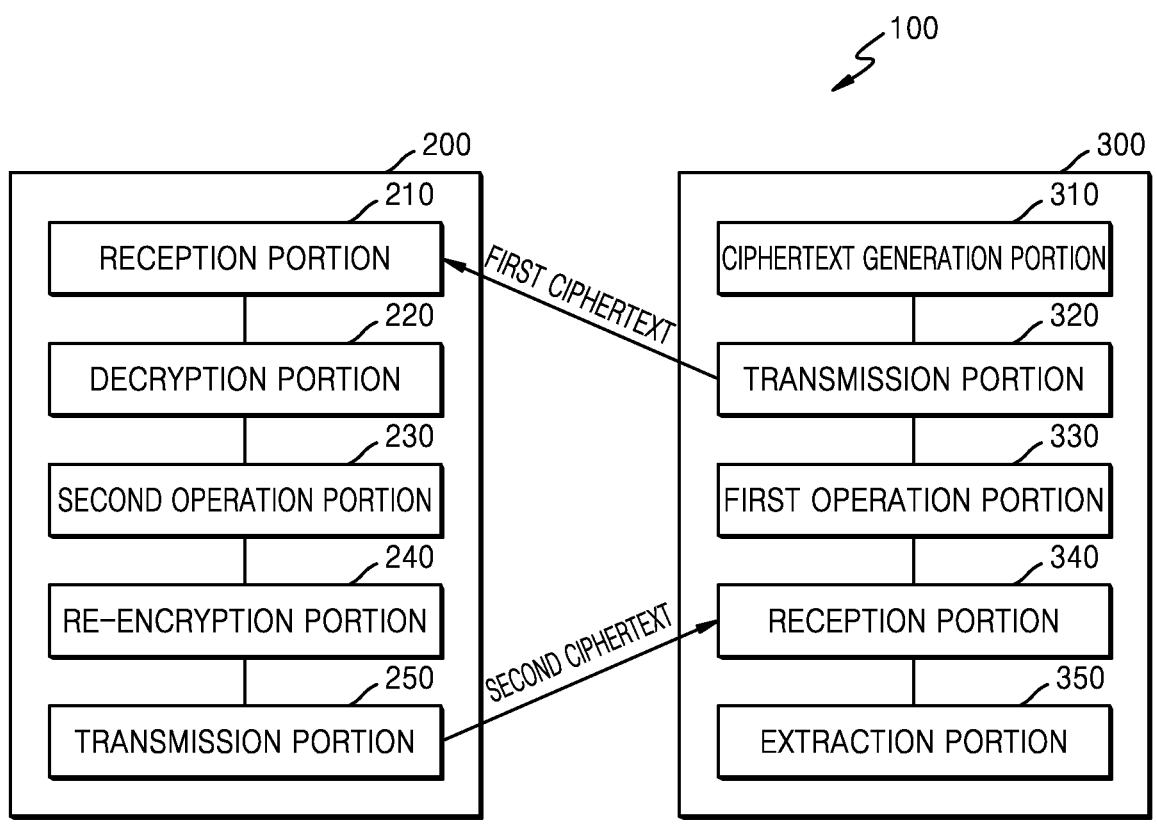
FIG. 1 illustrates a system for performing a homomorphic rotation by using a communication network, according to an embodiment of the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, detailed embodiments of the disclosure are described with reference to the drawings. The descriptions in detail below are provided to help comprehensive understanding with respect to a method, a device, and/or a system described in this specification. However, the descriptions are only examples, and the disclosure is not limited thereto.

While describing the embodiments of the disclosure, detailed descriptions about related well known arts are omitted, when it is determined that they may unnecessarily blur the points of the disclosure. The terms used below are defined by taking into account corresponding functions in the disclosure and may be different according to an intention of a user or an operator, a precedent, or the like. Therefore, the definitions of the terms have to be understood based on the general aspects throughout the specification. The terms used in the detailed description are merely used to describe embodiments of the disclosure and shall not be understood as restricting the embodiments. Unless clearly otherwise used, a singular expression denotes a meaning of a plural expression. In the description, it should be understood that the terms, such as "including" or "having," are intended to indicate the existence of the features, numbers, steps, actions, components, parts, or combinations thereof, and are not intended to preclude the possibility that one or more other features, numbers, steps, actions, components, parts, or combinations thereof may exist or may be added.

FIG. 1 illustrates a system for performing a homomorphic rotation by using a communication network, according to an embodiment of the disclosure.

The system 100 illustrated in FIG. 1 shows an example of performing a homomorphic permutation by using communication between two terminals, that is, a first terminal 200 and a second terminal 300. According to an embodiment of the disclosure, the first terminal 200 may be a client, and the second terminal 300 may be a server. According to another embodiment of the disclosure, the first terminal 200 may be, for example, a data provisioning device provisioning data without disclosing personal information. The second terminal 300 may be, for example, a data analyzing device or a data processing device analyzing or processing personal information received from the first terminal 200. According to another embodiment of the disclosure, the first terminal 200 refers to a device owning input data of an operation. The first terminal 200 has a secret key with respect to a ciphertext and does not attempt to disclose information about the secret key to the second terminal 300. The second terminal 300 refers to a device performing operations by using encrypted data of the first terminal 200. The second terminal 300 does not have a secret key with respect to a ciphertext and does not attempt to disclose a calculation process to the first terminal 200.

According to another embodiment of the disclosure, the second terminal 300 may provide an artificial intelligence service by analyzing or processing information provided by the first terminal 200 without disclosing the information to the outside. For example, the second terminal 300 may analyze health information of a user of the first terminal 200, by using DNA information of the user of the first terminal 200, without disclosing the DNA information to the outside.

The first and second terminals 200 and 300 may include devices capable of performing communication with external devices and performing encryption by using homomorphic encryption, such as a cellular phone, a smartphone, a smart watch, a hand-held device, a wearable device, a robot, a personal computer (PC), a notebook computer, a tablet PC, etc.

Homomorphic encryption denotes an encryption technique to perform operation on encrypted data. It is an encryption method for performing an arbitrary logical operation or arithmetic operation using encrypted data. When homomorphic encryption is used, data leakage and hacking damage may be prevented. When a plurality of pieces of data are encrypted in one ciphertext and a position of each piece of data has to be changed, a homomorphic permutation and homomorphic multiplication of homomorphic encryption are used. One ciphertext is composed of a number of slots, and each slot has a specified order and occupies a specified position in one ciphertext.

According to an embodiment of the disclosure, the first terminal 200 and the second terminal 300 may perform a homomorphic permutation by using wired or wireless communication.

Homomorphic rotation refers to an operation of performing a cyclic shift on an encrypted vector in which a number of pieces of data that are encrypted in one ciphertext are respectively moved with a fixed shift step in cyclic manner, in an encrypted state. When a general permutation operation, except for a cyclic shift, is performed on one ciphertext, a vector containing 0 and 1 is multiplied based on homomorphic multiplication, with respect to each of ciphertexts, on which a cyclic shift of all types of steps corresponding to a shift distance of data is performed. Here, the multiplication is performed by using the vector including 1 with respect to data positioned in an intended position and the vector including 0 with respect to data not positioned in an intended position. Thereafter, homomorphic addition is performed on all of the processed ciphertexts.

Figure 2:
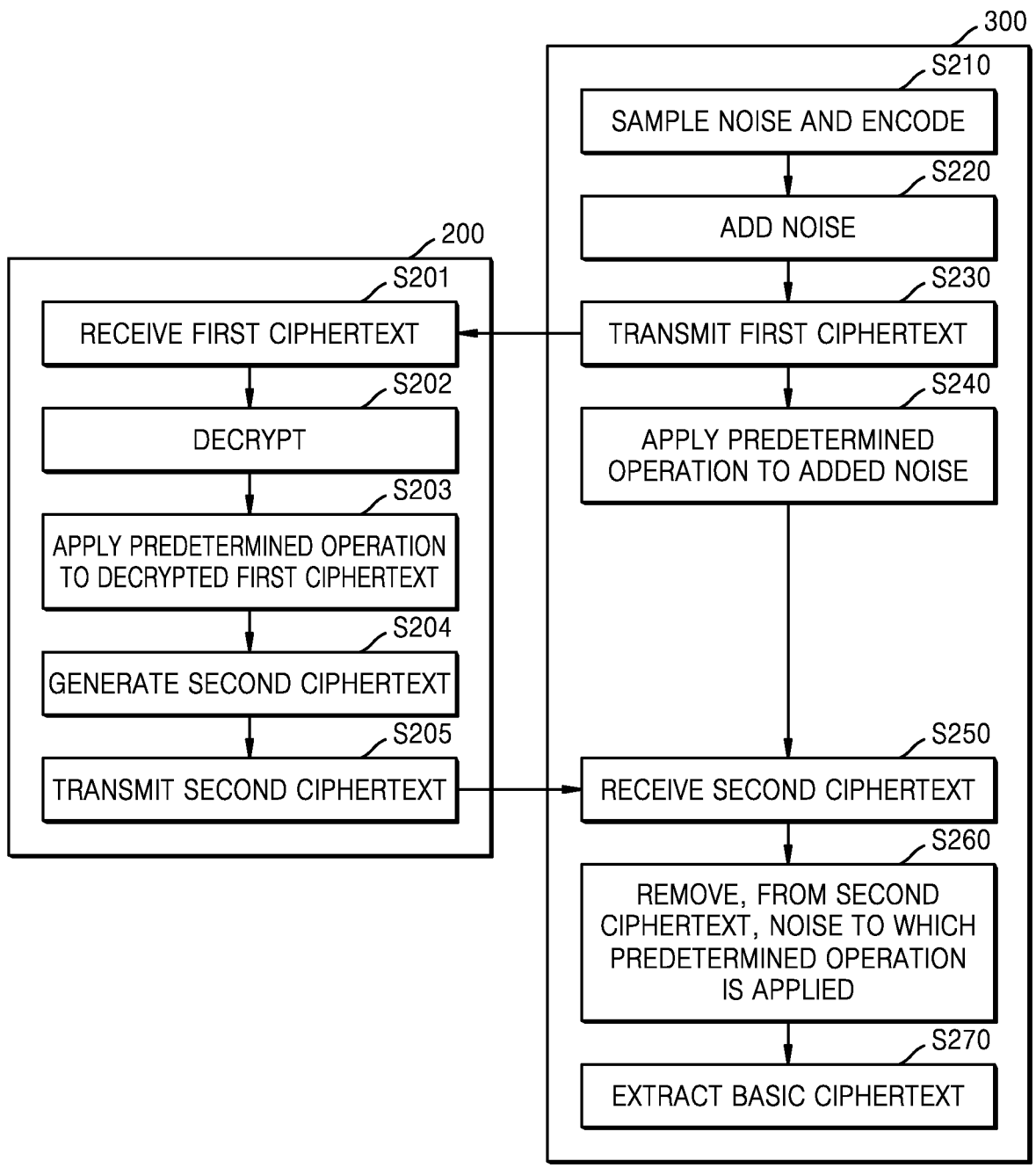
FIG. 2 is a flowchart of homomorphic rotation between two terminals, using a communication network, according to an embodiment of the disclosure.
Figure 3:
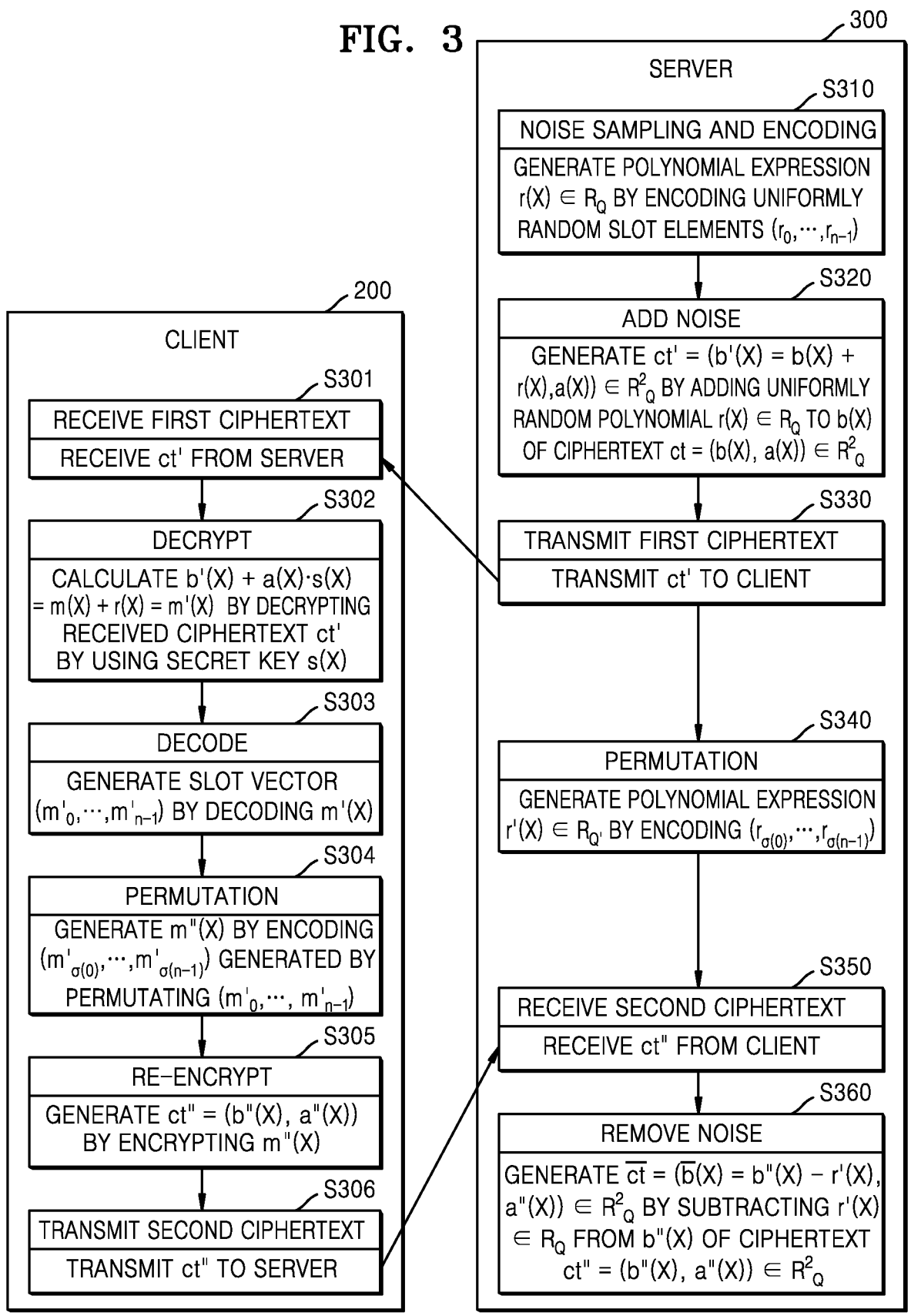
FIG. 3 illustrates an example of a process of performing a permutation operation of a homomorphic permutation between a server and a client, according to an embodiment of the disclosure.

According to an embodiment of the disclosure, the first terminal 200 and the second terminal 300 may perform communication between each other in order to perform a homomorphic permutation. Referring to FIGS. 2 and 3, a method of performing a homomorphic permutation is described, based on an example in which the first terminal 200 is a client, and the second terminal 300 is a server.

FIG. 2 is a flowchart of homomorphic rotation between the first terminal 200 and the second terminal 300, using a communication network, according to an embodiment of the disclosure.

According to an embodiment of the disclosure, it is assumed that the first terminal 200 and the second terminal 300 have a prior agreement on a permutation operation.

As shown in FIG. 1, the second terminal 300 may include a ciphertext generation portion 310, a transmission portion 320, a first operation portion 330, a reception portion 340, and an extraction portion 350. A process performed by the second terminal 300 for performing a homomorphic rotation is described first.

Referring to FIG. 2, the ciphertext generation portion 310 may perform noise sampling and encoding of the sampled noise in operation S210. Thereafter, a first ciphertext may be generated by adding first noise to a basic ciphertext in operation S220. The basic ciphertext may refer to a ciphertext with respect to original data encrypted by using a homomorphic algorithm.

The transmission portion 320 may transmit the first ciphertext to the first terminal 200 in operation S230.

The first operation portion 330 may apply a predetermined operation to the noise added by the encryption generation portion 310, in operation S240.

The reception portion 340 may receive a second ciphertext from the first terminal 200 in operation S250. The second ciphertext may refer to a ciphertext that is re-encrypted by the first terminal 200 after decrypting the first ciphertext received and then performing, on the decrypted first ciphertext, a predetermined operation previously agreed upon between the first terminal 200 and the second terminal 300.

In operation S260, the extraction portion 350 may remove, from the received second ciphertext, second noise indicating the noise to which the predetermined operation has been applied by the first operation portion 300 in operation S240. Thereby, a basic ciphertext is extracted in operation S270.

As shown in FIG. 1, the first terminal 200 may include a reception portion 210, a decryption portion 220, a second operation portion 230, a re-encryption portion 240, and a transmission portion 250. A process of performing a homomorphic rotation operation by the first terminal 200 is described below.

Referring to FIG. 2, the reception portion 210 may receive a first ciphertext from the second terminal 300 in operation S201. The first ciphertext may refer to a ciphertext that is modified from a basic ciphertext by the second terminal 300 adding noise to the basic ciphertext. The decryption portion 220 may decrypt the received first ciphertext by using a secret key in operation S202.

The second operation portion 230 may perform, on the decrypted first ciphertext, a predetermined operation that is agreed upon between the first terminal 200 and the second terminal 300 in advance, in operation S203. The re-encryption portion 240 may generate a second ciphertext by re-encrypting the first ciphertext on which the predetermined operation is performed by the second operation portion 230, in operation S204. Then, the transmission portion 250 may transmit the second ciphertext to the second terminal 300.

FIG. 3 illustrates an example of performing a permutation operation of a homomorphic permutation between a server and a client, according to an embodiment of the disclosure. FIG. 3 illustrates an example of performing the permutation operation of the homomorphic permutation by using homomorphic encryption. Homomorphic encryption may be homomorphic encryption of Cheon-Kim-Kim-Song (CKKS).

The ciphertext generation portion 310 may generate a first ciphertext that is modified from a basic ciphertext by adding noise to the basic ciphertext in operations S310 and S320. The basic ciphertext may correspond to an input ciphertext on which a permutation is to be performed. Also, with respect to N which is one of the powers of 2, and Q which is a product of large prime numbers, $R_Q$ may be a set of all polynomial expressions which may correspond to remaining ones after the polynomial expressions are sequentially divided by Q and $X^N+1$. The basic ciphertext may be composed of two polynomial expressions $R_Q^2$ included in this set. All ciphertexts described hereinafter may be composed in this way. The basic ciphertext may be assumed as shown in Equation 1.

$$ct=(b(X),a(X))\in R_Q^2 \quad \text{[Equation 1]}$$

In the description below, a process of obtaining a polynomial expression r (X) in the set $R_Q$ by encoding a slot vector $(r_0, r_1, \ldots, r_{n-1})$ may be frequently used. In this case, with respect to a complex number $$\zeta = e^{\frac{\pi i}{N}},$$

a calculation is performed such that after obtaining an $n-1^{th}$ order polynomial expression r' (X) of an only real number coefficient, satisfying $r'(\zeta^{5^j})=r_j$, with respect to $j=0, \ldots, n-1$, $r(X)=\lfloor \Delta \cdot r'(X) \rceil \in R_Q$ may be obtained with respect to a predetermined integer $\Delta$. All the following encoding process is defined as below.

The ciphertext generation portion 310 may sample noise in operation S310. The noise may have a form of a slot vector $(r_0, r_1, \ldots, r_{n-1})$ and each $r_i$ may be represented in the form of a polynomial expression extracted from a uniform distribution in the set $\mathbb{Z}_Q$. Here, the set $\mathbb{Z}_Q$ refers to a set of remaining ones of an integer divided by Q. This may be encoded to generate a polynomial expression r(X) of the noise.

Also, the polynomial expression r(X) of the noise may be added to a first polynomial expression b(X) of two polynomial expressions included in the basic ciphertext, as shown in Equation 2.

$$b'(X)=b(X)+r(X) \quad \text{[Equation 2]}$$

Thereafter, a first ciphertext, which is modified from the basic ciphertext by adding noise thereto, may be generated in operation S320. The first ciphertext is defined as Equation 3.

$$ct'=(b'(X),a(X))\in R_Q^2 \quad \text{[Equation 3]}$$

The transmission portion 320 may transmit the first ciphertext $ct'=(b'(X), a(X))\in R_Q^2$ generated by the ciphertext generation portion 310 to the first terminal 200 in operation S330.

The first operation portion 330 may obtain $(r_{\sigma(0)}, r_{\sigma(1)}, \ldots, r_{\sigma(n-1)})$ by applying a permutation function $\sigma$ to the slot vector $(r_0, r_1, \ldots, r_{(n-1)})$ obtained from the ciphertext generation portion 310. Then, second noise r'(X) may be obtained by encoding $(r_{\sigma(0)}, r_{\sigma(1)}, \ldots, r_{\sigma(n-1)})$ based on a polynomial expression in $R_Q$ in operation S340. That is, the first operation portion 330 may apply a predetermined operation previously agreed upon between the first terminal 200 and the second terminal 300 to the noise added to the basic ciphertext by the ciphertext generation portion 310.

The reception portion 340 may receive a second ciphertext from the client 200 in operation S350. The second ciphertext may indicate a ciphertext that is re-encrypted by the first terminal 200 after decrypting the first ciphertext and then performing, on the decrypted first ciphertext, the predetermined operation previously agreed upon between the first terminal 200 and the second terminal 300. The second ciphertext may be defined as Equation 4.

The extraction portion 350 may extract the basic ciphertext by removing, from the received second ciphertext, the noise to which the predetermined operation is applied, in operation S360. When the second ciphertext $ct''=(b''(X), a''(X))$ is received from the first terminal 200, second noise $r'(X)$ may be calculated by the first operation portion 330 and may be removed from a first element $b''(X)$ of the second ciphertext, to obtain $\bar{b}(X)=b''(X)-r'(X)$ and compose $\bar{ct}=(\bar{b}(X), a''(X))\in R_Q^2$. A vector of $(v_0, v_1, \ldots v_{(n-1)})$ is derived when $m(X)$ decoding is performed by decrypting the basic ciphertext owned by the server 300. Specifically, a vector of $(v_{(\sigma(0))}, v_{(\sigma(1))}, \ldots, v_{(\sigma(n-1))})$, which is permutated from the vector of $(v_0, v_1, \ldots, v_{(n-1)})$ via the permutation function σ, may be derived, when the extraction portion 350 decrypts and decodes the extracted basic ciphertext.

According to an embodiment of the disclosure, the client 200 may include the reception portion 210, the decryption portion 220, the second operation portion 230, the re-encryption portion 240, and the transmission portion 250.

Referring to FIG. 3, the client 200 may receive a first ciphertext from the server 300 in operation S301. The first ciphertext may be represented by Equation 3. The decryption portion 220 of the client 200 may decrypt the first ciphertext by using a secret key $s(X)$ to calculate $b'(x)+a(x)s(x)=m(X)+r(X)=m'(X)$ in operation S302. Here, $m(X)$ denotes a polynomial expression obtained by encoding a slot vector $(v_0, v_1, \ldots, v_{(n-1)})$ encrypted in an input basic ciphertext.

The decryption portion 220 may obtain a slot vector $(m'_0, m'_1, \ldots, m'_{n-1})$ by decoding the calculated $m'(X)$, in operation S303.

The second operation portion 230 may obtain $(m'_{\sigma(0)}, m'_{\sigma(1)}, \ldots, m'_{\sigma(n-1)})$ from $(m'_0, m'_1, \ldots, m'_{n-1})$ by applying a predetermined permutation to the decrypted first ciphertext and may encode $(m'_{\sigma(0)}, m'_{\sigma(1)}, \ldots, m'_{\sigma(n-1)})$ to obtain $m''(X)$ in operation S304.

$(m'_{\sigma(0)}, m'_{\sigma(1)}, \ldots, m'_{\sigma(n-1)})$ may maintain an encrypted state by the slot vector $(r_0, r_1, \ldots, r_{(n-1)})$ obtained by the encryption generation portion 310 of the server 300, and thus, the client 200 may not know information of the server 300 after decryption and decoding.

The re-encryption portion 240 may encrypt $m''(X)$ to generate a second ciphertext as shown in Equation 4, in operation S304. The transmission portion 250 may transmit the second cryptogam to the server 300 in operation S305.

$$ct''=(b''(X),a''(X))\in R_Q^2 \quad \text{[Equation 4]}$$

Figure 4:
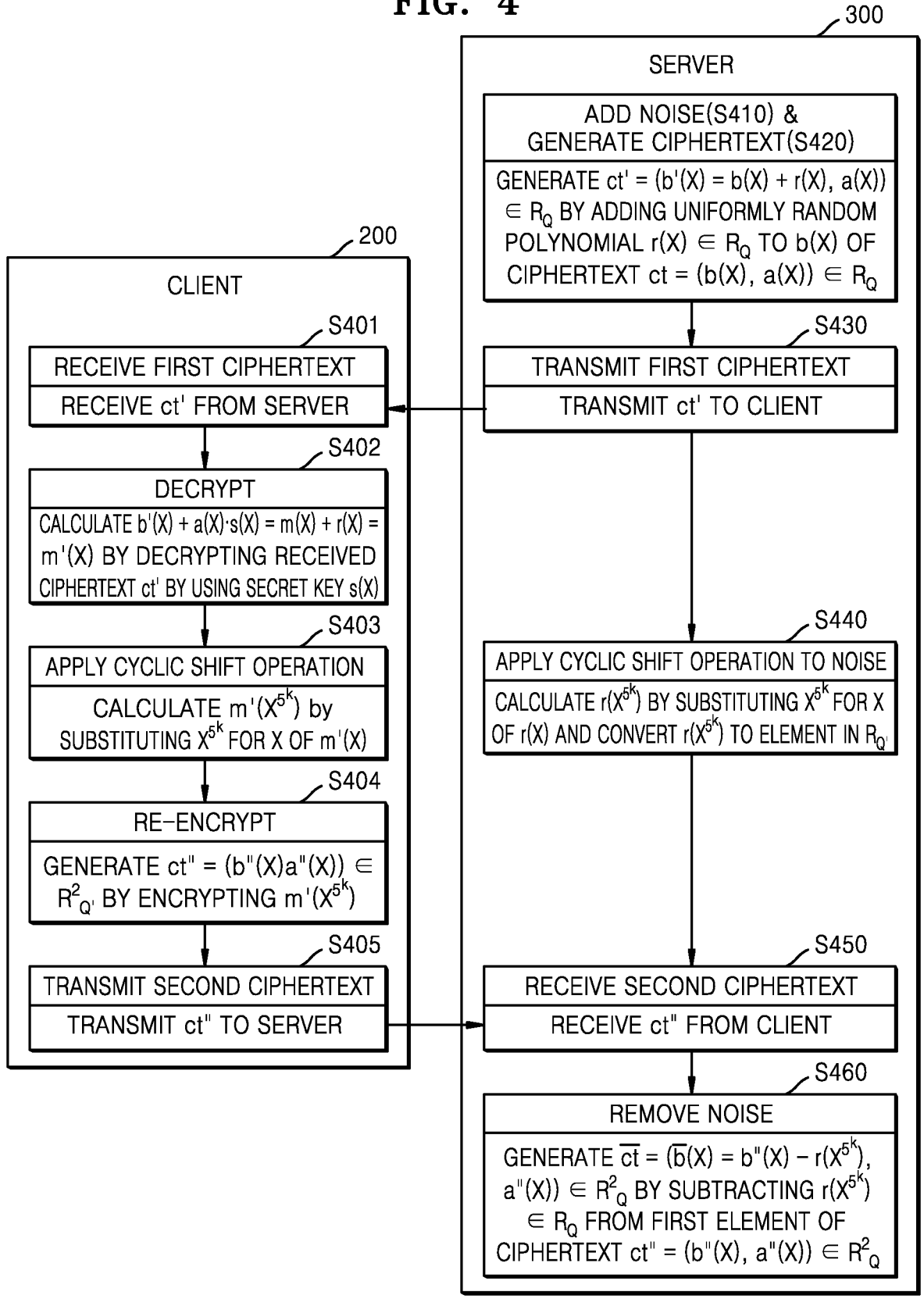
FIG. 4 illustrates an example of a process of performing a cyclic shift operation of a homomorphic permutation between a server and a client, according to an embodiment of the disclosure.

FIG. 4 is an example of performing, via the first terminal 200 and the second terminal 300, a cyclic shift operation of a homomorphic permutation, according to another embodiment of the disclosure. According to an embodiment of the disclosure, when a vector of $(v_0, v_1, \ldots, v_{n-1})$ is encrypted by the server 300 in a basic ciphertext, the server 300 may, through communication with the client 200, attempt to obtain a ciphertext in which a vector $(v_k, v_{k+1}, \ldots, v_{n-1}, v_0, \ldots, v_{k-1})$, which is cyclically shifted by k, is encrypted. FIG. 4 illustrates a case of using homomorphic encryption of CKKS, according to an embodiment.

For descriptions of homomorphic permutation of FIG. 4 that are substantially the same as those of homomorphic permutation of FIG. 3 will be omitted.

In operation S403, the second operation portion 230 of the client 200 may obtain $m'(X^{5^k})$ by applying a cyclic shift operation by substituting $X^{5^k}$ for X in $m'(X)$. Also, in operation S440, the first operation portion 330 of the server 300 may obtain $r(X^{5^k})$ by substituting $X^{5^k}$ rather than X for $r(X)$, which is a noise element added to a basic ciphertext (S420). Also, this may be converted to an element of $R_Q^2$, which is a space of a new ciphertext. In S450, the server 200 receives a second ciphertext from the client. In operation S460, noise to which the cyclic shift operation is applied may be removed from the second ciphertext. As a result, a basic ciphertext which is generated by encrypting a cyclic shift vector may be extracted. In detail, when the second ciphertext $ct''$ is received from the client, $r(X^{5^k})$ may be subtracted from $b''(X)$, which is a first element of the second ciphertext, to obtain $\bar{b}(X)=b''(X)-r(X^{5^k})$ and compose $\bar{ct}=(\bar{b}(X), a''(X))\in R_Q^2$.

Figure 5:
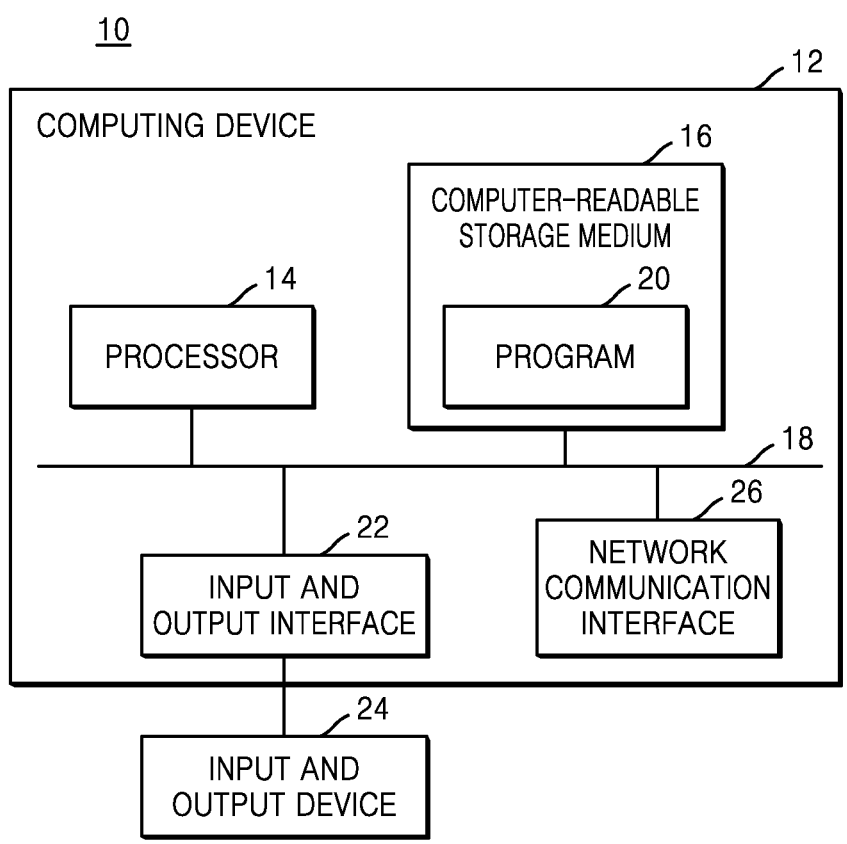
FIG. 5 illustrates an example of a computing environment including a computing terminal, according to an embodiment of the disclosure.

FIG. 5 illustrates an example of a computing environment including a computing terminal 12, according to an embodiment of the disclosure. In the embodiment illustrated in FIG. 5, each component may have different functions and capabilities from those described hereinafter. Also, in addition to the descriptions below, additional components may be included.

The computing terminal 12 may include at least one processor 14, a computer-readable storage medium 16, and a communication bus 18. The processor 14 may enable the computing terminal 12 to operate according to example embodiments described above. For example, the processor 14 may execute one or more programs stored in the computer-readable storage medium 16. The one or more programs may include one or more computer-executable instructions, and when the computer-executable instructions are executed by the processor 14, the computing terminal 12 may perform operations according to the example embodiments.

The computer-readable storage medium 16 may be configured to store computer-executable instructions or program codes, program data, and/or other appropriate type information. A program 20 stored in the computer-readable storage medium 16 may include a set of instructions executable by the processor 14. According to an embodiment, the computer-readable storage medium 16 may include a memory (a volatile memory such as random-access memory, a non-volatile memory, or an appropriate combination thereof), one or more magnetic disk storage devices, optical disk storage devices, flash memory devices, other types of storage media accessed by the computing terminal 12 and capable of storing desired information, or an appropriate combination thereof.

The communication bus 18 may connect various components of the computing terminal 12, including the processor 14 and the computer-readable storage medium 16, to one another. The computing terminal 12 may also include one or more input and output interfaces 22 providing an interface for one or more input and output devices 24 and one or more network communication interfaces 26. The one or more input and output interfaces 22 and the one or more network communication interfaces 26 may be connected to the communication bus 18. The one or more input and output devices 24 may be connected to other components of the computing terminal 12 through the one or more input and output interfaces 22. Examples of the input and output devices 24 may include a pointing device (a mouse, a track pad, or the like), an input device, such as a keyboard, a touch input device (a touch pad, a touch screen, or the like), a voice or sound input device, various types of sensor devices and/or capturing devices, and/or an output device, such as a display, a printer, a speaker, and/or a network card. The examples of the input and output devices 24 may be included in the computing terminal 12 as a component included in the computing terminal 12 or may be connected to the computing terminal 12 as a separate device from the computing device 12.

At least one of the components, elements or units (collectively "components" in this paragraph) represented by a block in the drawings, such as the first and second terminals 200 and 300 and their components illustrated in FIG. 1, may be embodied as various numbers of hardware, software and/or firmware structures that execute respective functions described above, according to embodiments. For example, at least one of these components may use a direct circuit structure, such as a memory, processing, logic, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions. Also, at least one of these components may further include a processor such as a central processing unit (CPU) that performs the respective functions, a microprocessor, or the like. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

According to an embodiment of the disclosure, an operation time taken when a cyclic shift occurs in an encrypted state may be reduced, with respect to homomorphic permutation, and without an arithmetic key required for each rotation operation with respect to homomorphic permutation, a cyclic shift or a permutation may be performed.

According to an embodiment of the disclosure, an arbitrary permutation may be performed through one time communication between a server and a client or between a first terminal and a second terminal, and thus, a time for an operation may be reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of performing a homomorphic permutation by a server, the method comprising:
   noise sampling and encoding the sampled noise, via a ciphertext generation portion;
   generating, via the ciphertext generation portion, a first ciphertext by adding first noise to a basic ciphertext;
   transmitting, via a transmission portion, the first ciphertext to a client;
   performing, via an operation portion, a predetermined operation on the first noise;
   receiving, via a reception portion, a second ciphertext from the client; and
   extracting, via an extraction portion, the basic ciphertext on which the predetermined operation is performed, by removing, from the second ciphertext, second noise,
   wherein the second ciphertext is a ciphertext that is re-encrypted by the client after decrypting the first ciphertext and performing the predetermined operation on the decrypted first ciphertext,
   wherein the first noise indicates the encoded sampled noise, and the second noise indicates the first noise on which the predetermined operation is performed by the operation portion in the server, and
   wherein the predetermined operation is previously agreed upon between the server and the client.

2. The method of claim 1, wherein the predetermined operation is a permutation operation.

3. The method of claim 1, wherein the predetermined operation is a cyclic shift operation.

4. The method of claim 1, wherein the basic ciphertext is a ciphertext with respect to original data encrypted by using a homomorphic algorithm.

5. The method of claim 1, wherein the noise is in a form of a polynomial expression extracted from a predetermined uniform distribution.

6. The method of claim 1, wherein the server and the client perform wired or wireless communication with each other.

7. The method of claim 1, wherein the server and the client have a prior agreement with respect to the predetermined operation.

8. A method of performing a homomorphic permutation by a client, the method comprising:
   receiving, via a reception portion, a first ciphertext from a server;
   decrypting, via a decryption portion, the first ciphertext by using a secret key;
   performing, via an operation portion, a predetermined operation on the decrypted first ciphertext;
   generating, via a re-encryption portion, a second ciphertext by re-encrypting the first ciphertext on which the predetermined operation is performed; and
   transmitting, via a transmission portion, the second ciphertext to the server,
   wherein the first ciphertext is a ciphertext that is modified from a basic ciphertext by the server adding first noise to the basic ciphertext,
   wherein the server extracts, via an extraction portion, the basic ciphertext on which the predetermined operation is performed, by removing, from the second ciphertext, second noise,
   wherein the first noise indicates the encoded sampled noise, and the second noise indicates the first noise on which the predetermined operation is performed by the operation portion in the server, and
   wherein the predetermined operation is previously agreed upon between the server and the client.

9. The method of claim 8, wherein the predetermined operation is a permutation operation.

10. The method of claim 8, wherein the predetermined operation is a cyclic shift operation.

11. A device for performing a homomorphic permutation, the device comprising:
    at least one processor and computer-readable medium comprising a ciphertext generation portion, a transmission portion, a reception portion, an operation portion, and an extraction portion,
    wherein the at least one processor is configured to execute:
      the ciphertext generation portion configured to generate a first ciphertext by adding first noise to the basic ciphertext;
      the transmission portion configured to transmit the first ciphertext to a terminal;

the reception portion configured to receive a second ciphertext from the terminal;

the operation portion configured to perform a predetermined operation on the noise; and the extraction portion configured to extract the basic ciphertext on which the predetermined operation is performed, by removing, from the second ciphertext, second noise, wherein the second ciphertext is a ciphertext that is re-encrypted by the terminal after decrypting the first ciphertext and performing the predetermined operation on the decrypted first ciphertext, wherein the first noise indicates the encoded sampled noise, and the second noise indicates the first noise on which the predetermined operation is performed by the operation portion in the server, and wherein the predetermined operation is previously agreed upon between the server and the client.

12. The device of claim 11, wherein the predetermined operation is a permutation operation.

13. The device of claim 11, wherein the predetermined operation is a cyclic shift operation.

14. The device of claim 11, wherein the basic ciphertext is a ciphertext with respect to original data encrypted by using a homomorphic algorithm.

15. A non-transitory computer-readable recording medium having stored thereon a program for executing the method of performing a homomorphic permutation of claim 1.

* * * * *